July 21, 1964  C. MacDONALD  3,141,381
REMOTE CONTROL APPARATUS
Filed June 20, 1960  2 Sheets-Sheet 1
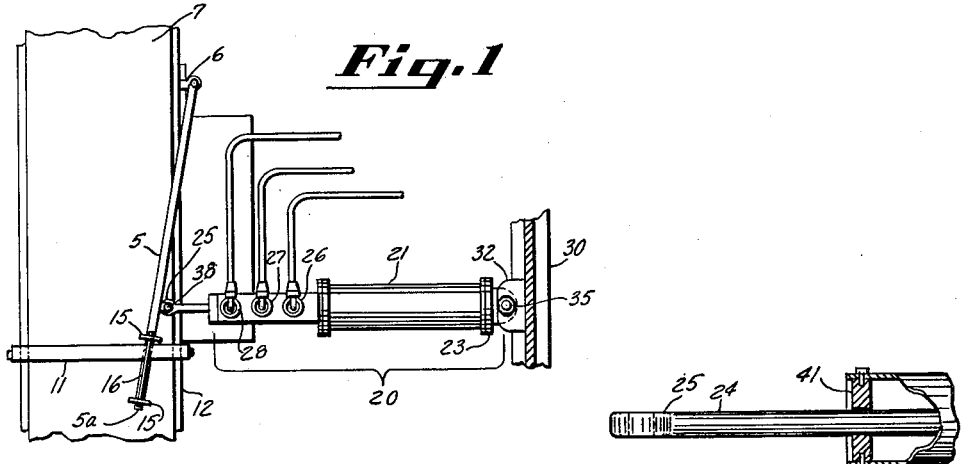
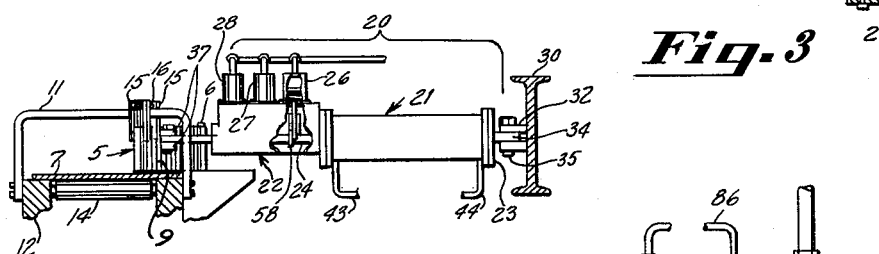
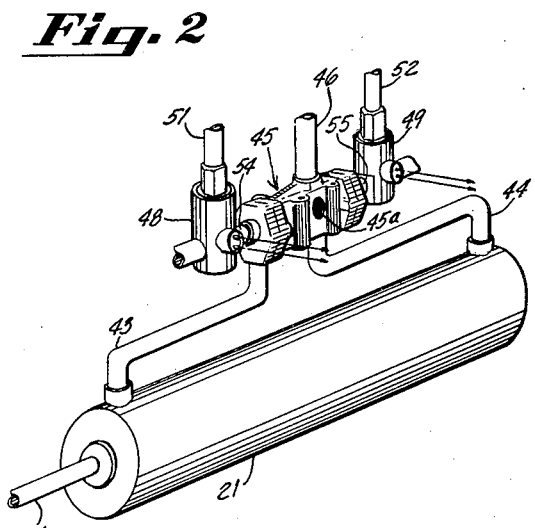
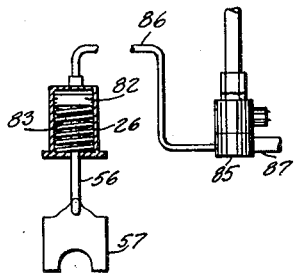
INVENTOR.
CHARLES MACDONALD
BY
*Henry Kozak*
ATTORNEY July 21, 1964    C. MacDONALD    3,141,381
REMOTE CONTROL APPARATUS
Filed June 20, 1960    2 Sheets-Sheet 2

INVENTOR.
CHARLES MACDONALD
BY
Henry Kozak
ATTORNEY

United States Patent Office 3,141,381
Patented July 21, 1964

3,141,381
REMOTE CONTROL APPARATUS
Charles MacDonald, Riverside, Ill., assignor to National Castings Company, a corporation of Ohio
Filed June 20, 1960, Ser. No. 37,233
9 Claims. (Cl. 91—42)

This invention relates to a control apparatus capable of incremental adjustment and particularly to apparatus incorporating a novel control device for deflecting loose granular or pulverulent material from an endless conveyor into one or more receivers.

The invention arises, for example, out of a need for equipment capable of diverting or removing fractions of the load of a continuous conveyor at one or more load-receiving stations, and furthermore, capable of satisfying continuous or intermittent demand of individual stations of which the number being simultaneously served may vary without varying the rate of operation of the conveyor. In an arrangement of this sort, the total demand from the conveyor may vary over a wide range. The total amount of material passing momentarily by any one of the stations, particularly those at the remote end of the distribution system, may vary substantially. Hence, in order to remove desired load fractions at the various stations requires much flexibility of control in the system as a whole, e.g., incremental control at the individual stations and selective control of the apparatus at each station relative to other stations.

It is the principal object of the present invention to provide control apparatus of simple design adapted for use in a variety of applications wherein mechanical control throughout a range of movement is desired in increments of predetermined magnitude.

Other objects are: to provide apparatus for fractional unloading of continuous conveyors of bulk materials; and to provide apparatus adapted for arrangement in a system of load-removing stations integrated as to control and dispersed along a continuous conveyor wherein the various stations may be individually and remotely controlled from a central control station, in accordance with the original loading of the conveyor and the fractions removed therefrom prior to the passage of the load by any particular unloading station.

In accomplishment of the above stated objects, the invention provides control apparatus comprising a pair of jacks, preferably fluid actuated, mounted in relatively fixed relationship and at generally right angles of each other. One jack has an external control member movable by the jack relative to its body through advance and return movements along a straight path. A detent means is mounted on the control member and projects therefrom in a lateral direction relative to the path of the member. The other jack, usually smaller than the first, has an external gate movable by the second jack relative to its body in a straight path toward and away from the path traversed by the control member. The gate and the detent means have abutment surfaces facing in opposite directions parallel to the path of the control member. The second jack is disposed relative to the first jack for movement of the gate into and out of the ambit of the detent traversed through the advance and return movements of the control member. When the gate occupies the ambit of the detent means, the latter engages the gate to cause stoppage of the control member. Means such as a fluid supply and exhaust system, including valves and controlling media therefor, such as electrical circuitry and instrumentation, operates the jacks in timed relationship to effect engagement of the detent means and the gate by movement of the gate preliminarily into the path of the detent means.

The jacks are preferably fluid-operated and, in a preferred application, are portions of an integral device used in combination with a pivotable plow positioned over a continuous conveyor to effect complete or fractional diversion of the load carried thereon.

The invention is described in detail with respect to the drawing of which the general nature of the figures is as follows:

FIG. 1 is a fragmentary plan view of the apparatus of the invention and the structural environment in which it is used.

FIG. 2 is a fragmentary elevation partly in section of the equipment shown in FIG. 1.

FIG. 3 is a fragmentary elevation in section of a modification of the invention.

FIG. 4 is a schematic view of the main control cylinder and fluid supply and exhaust means therefor.

FIG. 5 is an elevation partly in section of a gate and an actuating cylinder therefor employed as a stopping means for the control cylinder piston rod, as shown in FIGS. 1 and 2; included also is a valve for controlling the transfer of fluid into and out of the actuating cylinder.

Figure 6:
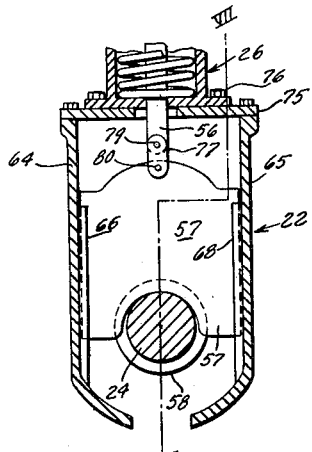
FIG. 6 is an elevation in section showing the cylinder and gate assembly of FIG. 5 in mounted relation with the control cylinder.

FIGS. 1 and 2 illustrate a preferred utilization of the invention as an agency for shifting a plow 4 pivotally supported on a pintle 6 above a conveyor belt 7. The plow 5 has a range of rotation relative to the pintle 6 enabling its free end 5a, i.e., the radially remotest portion of its blade 9, to traverse the entire width of the belt 7. The plow 5 is supported adjacent its free end on a bar 11 of inverted U-shape having its legs secured to the sides of a frame 12 comprising a series of rollers 14 for supporting the belt 7. The plow 5 comprises a pair of spaced lugs 15 and a bridge element 16 connecting the lugs and extending over the bar 11. This arrangement enables the outboard end of the plow to be supported by the bar 11 in pendant and slidable relation therewith and to fix the vertical relation of the blade with the belt 7.

Shifting of the plow 5 about its axis at the pintle 6 is accomplished by a device 20 comprising a master control cylinder 21, a housing 22 attached to the end of the cylinder 21 through which its piston rod 24 extends. The device 20 further comprises a plurality of gate cylinders 26, 27, and 28.

As shown, the device 20 is positioned between, and connected pivotally with, a fixed support 30, such as a building frame member and the plow 5. As the member 30 is fixed with respect to the path of the belt 7 and its frame 12, longitudinal expansion and contraction of the device 20 necessarily results in shifts of position of the plow 5. As shown, the device 20 is connected at its head-end by a forked joint comprising a clevis 32 on the member 30, a tongue 34 attached to the cap 23 of the cylinder, and a pin 35 extending through the tongue and clevis. The piston rod 24 terminates in an eye portion 25 forming a pivotal joint with a pair of lugs 37 and a pin 38 extending through the lugs and the eye portion 25.

In the arrangement of FIGS. 1 and 2, the device 20 may operate without substantial side stresses applied to the piston rod 24 because of the substantial support of the shovel provided by the bar 11 and the pintle 6. In some applications of the invention, side stresses acting on the piston rod 24 may be such as to warrant a bearing 41 in the end portion of the housing 22 for providing support of the piston rod 24 additionally to that supplied at the end of the cylinder 21. In some installations, a support, such as the bar 11, supplied to the member controlled by the device 20 may be eliminated by the use of a suitably strong pivotal connection with the support member 30 and a bearing 41 in the outboard extremity of the housing.

FIG. 4 illustrates schematically an arrangement for feeding an exhausting air from the main control cylinder 21. This cylinder is enclosed at both ends except for ducts 43 and 44 capable of exhausing air from one end of the cylinder when air is feeding into the other end from the other duct. The ducts 43, 44 are connected with, e.g., an air actuated valve 45 having its own air inlet 46, and which is in turn operated by solenoid-operated 3-way valves 48 and 49 having separate air feed ducts 51 and 52, respectively. Suitable for use as the valve 45 is Model 6247 Master Air Operating Valve manufactured by the Logan Engineering Company of Chicago, Illinois; valves 48 and 49 are readily supplied by the Skinner Chuck Company of New Britain, Connecticut.

Figure 8:
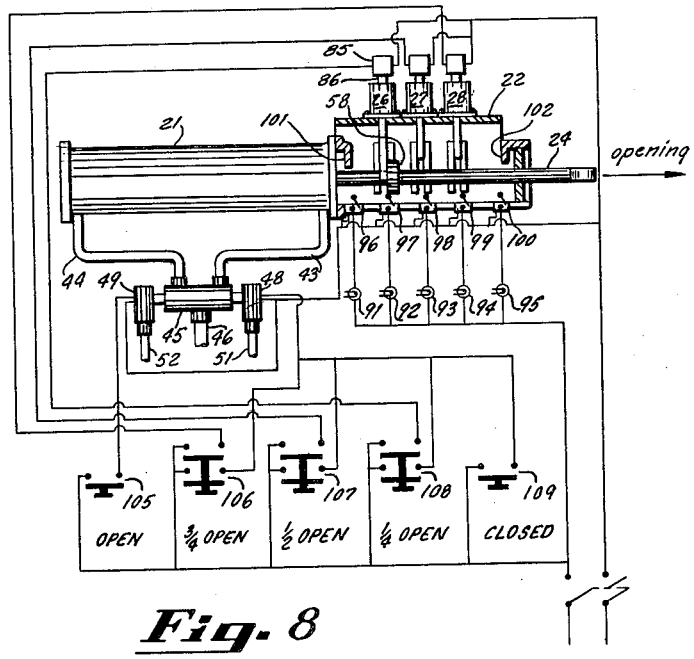
FIG. 8 is a diagram showing an electrical circuit facilitating remote control of various structural components of the present invention.

The valves 48 and 49 merely actuate the valve 45 and are connected with the latter by ducts 54 and 55, respectively. The solenoids of the valves 48 and 49 are electrically connected with switching apparatus, as shown in FIG. 8. The valve 45 is arranged internally to feed air through the tubes 43 and 44 selectively to either end of the cylinder while exhausting air from the other end through a port 45a to the atmosphere upon the application of air pressure through either one of the valves 48 and 49 to a corresponding side of the valve 45. The valves 48 and 49 are of a three-way type having ports for exhausting air from the valve 45 when the solenoids of the actuating valves are de-energized. Energizing of the solenoid of either one by a button electrically connected therewith, as shown in the diagram of FIG. 8, will actuate the valve 45 to cause passage of air from the duct 46 via the valve into the cylinder 21.

Figure 7:
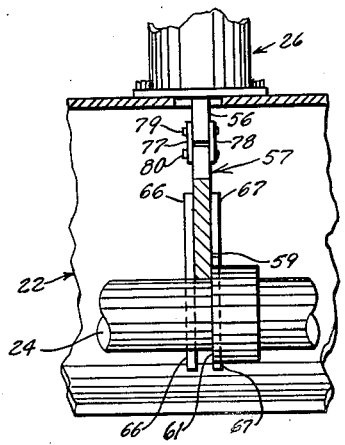
FIG. 7 is a fragmentary elevation in section taken along line VII—VII of FIG. 6.

FIGS. 5, 6, and 7 illustrate one cylinder 26 of the three similar gate cylinders 26, 27, 28, and a portion of the housing 22 in which the gate 57 is supported. In addition to supporting the cylinder 26 so that the piston rod 56 thereof reciprocates in a direction that is transverse and preferably in intersecting relation with the axis of the piston rod 24, the housing 22 has the further function of supporting the gate 57 against the thrust imposed on it in a direction lengthwise of the piston rod 24 by the cylinder 21 when actuated. The need for such support arises when a detent or stop collar 58 secured to the rod 24 engages a side abutment surface 59 of the gate. This surface engages a side abutment surface 61 of the collar. Both surfaces face in directions parallel to the longitudinal axis of the cylinder 21 and the direction of movement of piston rod 24 and its associated piston within the cylinder 21.

The gate 57 is guided in its movements lengthwise of the axis of cylinder 26, and also the direction of movement of the piston 56, by the side walls of the casing 22, and by ribs 66, 67, 68. Another rib cooperating with rib 68 to confine one side of the gate is not shown.

The cylinder 26 is secured to a top plate 75 of the guide structure 55 as by cap screws 76. The piston rod 56, as shown, is connected with the gate 51 by links 77, 78 and pins 79, 80. The cylinder 26 is of the single-acting type wherein the piston 82 is returned by a spring 83 from its downward position wherein the gate acts as a stop for the piston rod 24. Such return occurs upon the release of air confined in the cylinder at air-actuated condition. The desired operation of the cylinder may be accomplished through a solenoid-controlled three-way valve 85 similar to valves 48 and 49 and connected with the head end of the cylinder 26 by a duct 86. Air passes into this cylinder when the solenoid of the valve 85 becomes energized by closing a switch connected electrically therewith, for example, the button 106 on a remote control panel. In consequence, the cylinder 26 places the gate 51 in the path of the stop collar 58. When the solenoid circuit is open, the three-way valve 85 vents air from the cylinder 26 to the atmosphere. The valve 85 is connected by a supply duct 87 with an air supply which may be shared by ducts 46, 51, and 52.

FIG. 8 illustrates a simple circuit arrangement for operating the device 20 when adapted for adjustment of the control rod 24 to three intermediate positions in its control range between an open and a closed position. The control positions, including open and closed, are indicated by lights 91, 92, 93, 94, and 95 energized, respectively, by switches 96, 97, 98, 99, and 100. These switches are actuated by the stop collar 58. The entire range of movement for the stop collar may be defined, as shown in FIG. 8, by housing projections 101 (closed stop) and 102 (open stop). Switches 105, 106, 107, 108, and 109 enable the positioning of the stop collar at its various control positions.

In the present control system obtaining any one of the control positions is based upon movement of the piston rod from the open position toward the closed position, i.e., toward the left, as shown in FIG. 8. It will be understood that naming the positions is a matter of choice and that the order of naming may be reversed.

It will be noted that switches 106, 107, 108 for obtaining intermediate adjustments of the piston rod 24 are double-armature switches or buttons, and that when respective cylinders 26, 27, or 28 are energized, the side of the valve 45 is actuated for obtaining movement of the piston rod 24 to the left, i.e., toward the closed position. Closing respective circuits of any one of these switches results in actuation of the gate cylinder and the control cylinder 20 simultaneously but the flow of air into these cylinders is adjusted so that the gate cylinder places its respective gate in position adjacent the rod 24 before movement of the rod commences. This manner of operation enables the collar 58 to move into abutting relation with an initially positioned gate.

To obtain a new adjustment of the rod 24, the "open" switch 105 is momentarily pressed to back the collar 58 to the right, away from any gate against which it is bearing, whereupon such gate is snapped into retracted position by the spring of its respective gate cylinder. Thereafter the operator is free to press a button corresponding to any position he wishes. More complicated conventional systems of circuitry are available to those who wish to eliminate the pushing of the "open" button prior to readjustment of the control device 20.

FIG. 8 is illustrative of an electrical system suitable for controlling, e.g., the removal of sand or other material at a single receiving station along a belt conveyor. This system may be duplicated in respect to other receiving stations along the same conveyor. The switches and lights of a plurality of such systems are preferably incorporated in central control panel under the surveillance of a single operator. Obviously, such operator may adjust a load diverting shovel at each station in accordance with the load passing that station to obtain desired rates of load removal at the various stations in any desired overall pattern.

The terms and expressions which have been employed are used as terms of description and not of limitation, and there is no intention of excluding such equivalents of the invention described or of the portions thereof as fall within the purview of the claims.

What is claimed is:

1. Control apparatus comprising: a jack having an external control member movable relative to the body of the jack through advance and return movements along a straight path; detent means mounted on said member projecting therefrom in a lateral direction relative to the path; a second jack mounted in fixed relation with the first jack and having an external gate movable in a straight path toward and away from said path of the member, said gate having an abutment surface facing in a direction parallel to the first path and in reverse relation to advance movements of the member; said second jack disposed relative to the first jack for movement of the gate into and out of the ambit of the detent means for stoppage of the member at an intermediate point of its travel; means for actuating said second jack to normally maintain said gate out of said ambit; and means for simultaneously actuating the first jack in advance movements, and actuating the second jack to advance said gate into position for being engaged by the detent means.

2. The control apparatus of claim 1 comprising: guide means in fixed relation with the second jack for supporting the gate against side thrust forces parallel to the path of the control member.

3. Control apparatus comprising: a fluid jack comprising a cylinder, piston, and a control member disposed externally of the cylinder and connected with the piston and guidably supported by the cylinder for advance and return movements with the piston along a straight path; detent means mounted on said member projecting therefrom in a lateral direction relative to the path; a second fluid jack mounted in fixed relation with the first jack comprising a cylinder, a piston, and a gate disposed externally of the second cylinder; said gate connected with the piston and guidably supported for advance and return movements with the second piston along a straight path toward and away from said path of the member; said gate having an abutment surface facing in a direction parallel to the first path in reverse relation to the direction of advance movements of said member; the second jack disposed relative to the first jack for movement of the gate into and out of the ambit of the detent means for stoppage of the member at an intermediate point of travel; the second jack having resilient means for normally maintaining said gate out of said ambit; and means for simultaneously actuating both jacks in respective advance movements of the member and the gate to effect engagement of said detent means and the abutment surface.

4. Control apparatus comprising: a fluid jack comprising a cylinder, a support attached to an end of the cylinder and extending away from the cylinder in a direction parallel to its longitudinal axis, a piston within said cylinder, a piston rod extending from the piston lengthwise of said axis past said end beyond said support; detent means mounted on a portion of the rod disposed exteriorly of the cylinder at all operative positions of the piston; a second fluid jack fixed to said support comprising a cylinder, a piston within said cylinder, a piston rod, a gate attached exteriorly of the second cylinder to the second rod for movement lengthwise of the axis of the second cylinder into and out of an ambit traversed by said detent means, a spring for urging an assembly of the second jack comprising the piston, piston rod, and gate thereof away from the axis of the first named cylinder; said detent means and the gate having abutment surfaces facing in opposite directions parallel to said axis of the first cylinder; fluid supply and withdrawal means connected of both jacks for supplying fluid thereto; and control means for directing fluid from said supply means into portions of said cylinders effecting movement of said gate into said ambit and movement of said detent means in the direction in which its abutment surface faces.

5. The control apparatus of claim 4 comprising: parallel guides disposed at opposite sides of the axis of the second cylinder in a plane transverse to the axis of the first cylinder; said guides mounted in fixed relation with the support and in cooperative guide relation with portions of the gate to support the gate against side thrust forces parallel to that of the axis of the first cylinder.

6. The control apparatus of claim 4 wherein: an outboard end portion of the support consists of a bearing in laterally supporting relation with said rod of the first cylinder.

7. The control apparatus of claim 4 wherein: said first cylinder is closed at both ends; said fluid supply and withdrawal means comprises duct means connected with opposite ends of the first cylinder, valve means for selectively directing fluid into and out of both ends of said cylinder, duct means including valve means connected with the head end of the second cylinder, and control means for simultaneously actuating the two valve means to effect movement of fluid into the second cylinder and a permanently selected end of the first cylinder; and said apparatus comprises spring means for returning the gate-rod-piston assembly of the second cylinder to a position laterally outwardly from said ambit upon the release of fluid therefrom.

8. The control apparatus of claim 4 wherein: said support comprises a housing extending lengthwise of a portion of the piston rod of the first jack disposed exteriorly of the cylinder, and said housing supports the second jack and terminates outboardly in a bearing in laterally supporting relation with the piston rod of the first jack.

9. The control apparatus of claim 4 comprising a housing as said support coextensive with an exterior portion of the piston rod of the first jack; a plurality of gate jacks similar to said second jack mounted on said housing serially in respect to the length of said piston rod; said gate jacks being spaced for incremental adjustment of said piston rod; the cylinder of the first jack being closed at both ends and having duct means connecting said ends with said fluid supply and withdrawal means; the cylinder in each gate jack being connected with said fluid supply and withdrawal means; each gate jack of said plurality having spring means urging the gate-rod-piston assembly thereof to a position outside the region traversed by the detent means; and control means for said fluid supply and withdrawal means for directing fluid simultaneously to a permanently selected one of said ends and selectively to each of the cylinders of said gate jacks.

References Cited in the file of this patent

UNITED STATES PATENTS

| | | |
|---|---|---|
| 1,965,751 | Rush | July 10, 1934 |
| 2,118,890 | Maes | May 30, 1938 |
| 2,130,618 | Gnavi | Sept. 20, 1938 |
| 2,698,157 | Ludeman | Dec. 28, 1954 |
| 2,769,530 | Powers | Nov. 6, 1956 |
| 2,860,751 | Seigle | Nov. 18, 1958 |
| 2,936,062 | Wilcox | May 10, 1960 |
| 2,949,889 | Ivankovics et al. | Aug. 23, 1960 |
| 2,984,212 | Hicks et al. | May 16, 1961 |